US006180765B1

(12) United States Patent
Ebenezer

(10) Patent No.: US 6,180,765 B1
(45) Date of Patent: Jan. 30, 2001

(54) REACTIVE DIAMINE-LINKED AZO DYES

(75) Inventor: Warren James Ebenezer, Stockport (GB)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/462,497

(22) PCT Filed: Jul. 17, 1998

(86) PCT No.: PCT/GB98/02123

§ 371 Date: Jan. 24, 2000

§ 102(e) Date: Jan. 24, 2000

(87) PCT Pub. No.: WO99/05223

PCT Pub. Date: Feb. 4, 1999

(30) Foreign Application Priority Data

Jul. 25, 1997 (GB) .................................................. 9715831

(51) Int. Cl.$^7$ ............................ C09B 62/507; C09B 62/08
(52) U.S. Cl. ............................................. 534/634; 534/612
(58) Field of Search .................................. 534/634

(56) References Cited

FOREIGN PATENT DOCUMENTS

2001960 * 7/1970 (DE) .
391264 * 10/1990 (EP) .

* cited by examiner

Primary Examiner—Fiona T. Powers
(74) Attorney, Agent, or Firm—Oblon, Spivak, McClelland, Maier & Neustadt, P.C.

(57) ABSTRACT

Reactive dyes containing two units each comprising a monoazo or disazo chromophore linked to a triazinylamino group, each of which units is linked by a diamine unit disposed between the triazine rings.

38 Claims, No Drawings

REACTIVE DIAMINE-LINKED AZO DYES

This invention relates to reactive dyes containing two units each comprising a monoazo or disazo chromophore linked to a triazinylamino group, each of which units is linked by a diamine unit disposed between the triazine rings.

GB-A-1 283771 discloses a range of reactive diamine dyes of the formula (A)

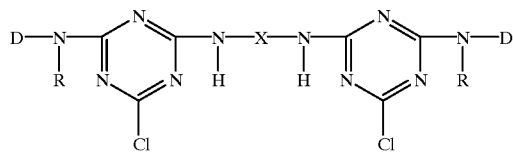

(A)

where D is naphthylazo-phenylene or naphthalene containing at least 3 sulphonic acid groups, R is H or an optional substituted $C_{1-4}$ alkyl group and X is specifically a phenylene, diphenylene or naphthalene nucleus. They offer a degree of fixation over a wide range of liquor to goods ratios and provide shades of very good light fastness.

U.S. Pat. No. 5,149,789 discloses a range of dyestuffs some of which have two or three halotriazine rings interconnected by an aromatic diamine unit or two aromatic diamine units respectively. In one such dye (Example 53), the linking diamine unit carries a phenylazo group. The dye has the formula

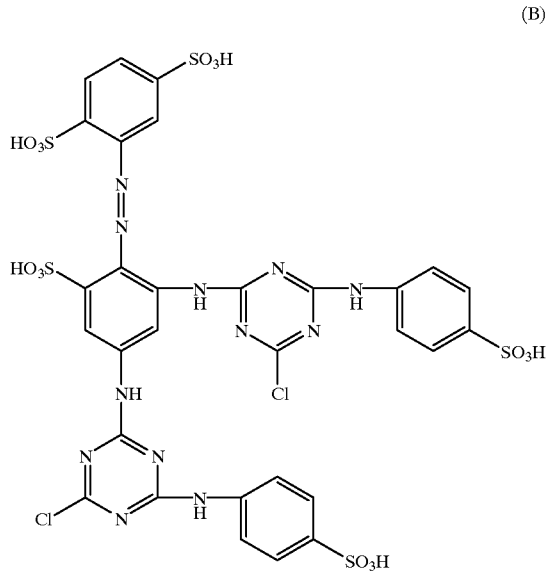

(B)

However, in contrast to the range of dyes disclosed in GB-A-1283771 above, neither substitution on the respective halotriazinylamino groups is a chromophore as such. Accordingly such a dye does not have a particularly high dyeing strength.

We have found surprisingly that if, in a dyestuff of the formula (A), the linking diamine additionally carries an arylazo group, then excellent build up properties can be achieved, as well as excellent light fastness and aqueous solubility. Moreover the dyes still offer a degree of fixation over a wide range of liquor to goods ratios. These properties manifest themselves especially when the dyes are used to exhaust dye cotton.

Thus according to one aspect the invention provides a dye of the formula (I)

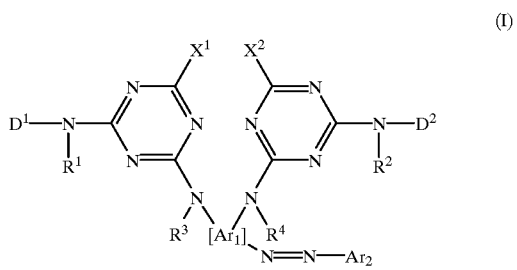

(I)

wherein:

Ar$_1$ is an optionally substituted arylene group;

Ar$_2$ is an optionally substituted aryl group;

each of $D^1$ and $D^2$, independently, is a chromophoric group;

each of $R^1$, $R^2$, $R^3$ and $R^4$, independently, is H or alkyl; and each of $X^1$ and $X^2$ independently, is a labile atom or group.

Preferably, each of $X^1$ and $X^2$, independently, is a halogen atom or a pyridinium salt (typically a 3- or 4-carboxy pyridinium salt derived respectively from nicotinic and isonicotinic acid), and is more preferably F or Cl. Still more preferably, each of $X^1$ and $X^2$ is Cl.

It is also preferred that each of $R^1$, $R^2$, $R^3$ and $R^4$, independently, is H or $C_{1-4}$ alkyl, more preferably hydrogen, methyl, ethyl or n- or I-propyl.

In the formula (I), it is preferred that Ar$_1$, be an optionally substituted phenylene, naphthalene or diphenylene group; and a still more preferred range of dyes has the formula (II)

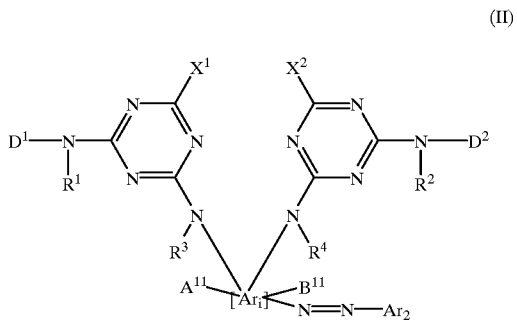

(II)

wherein

Ar$_1$, is a phenylene, naphthalene or diphenylene group;

each of $A^{11}$ and $B^{11}$, independently, is optionally present and is a halogen atom, an alkoxy group, hydroxy group or a sulphonic acid group or a salt thereof; and each of $D^1$, $D^2$, $R^1$, $R^2$, $R^3$, $R^4$, $X^1$, $X^2$ and Ar$_2$ are as defined above.

An especially preferred range of dyes has the formula (III)

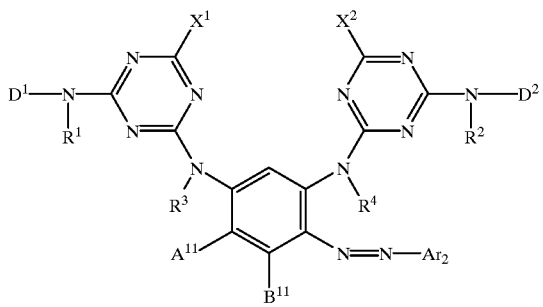

(III)

wherein each of $D^1$, $D^2$, $R^1$, $R^2$, $R^3$, $R^4$, $X^1$, $X^2$, $A^{11}$, $B^{11}$ and $Ar_2$ are as defined above.

It is also preferred for $Ar_2$, in the formula (I), to be an optionally substituted phenyl group, still more preferably a phenyl group substituted by a vinylsulphone or a precursor thereof. Preferred precursors are a β-sulphatoethylsulphone, a β-acyloxy- (more preferably $C_{2-5}$ acyloxy-) ethylsulphone or allylsulphone, especially a β-sulphatoethylsulphone.

Each of $D^1$ and $D^2$, independently, may be an optionally metallized monoazo chromophore of the formula (IV)

(IV)

wherein
one of A and E is attached to the reactive triazinylamino group;
A is derived from a diazotizable amine; and
E is derived from a coupling component.
Preferably in the formula (IV),
A Is an optionally substituted aryl group and when A is attached to the triazinylamino group the attachment may be from the aryl group or from a substituent thereon; and
E is an optionally substituted aryl or heteroaryl group and when E is attached to the triazinylamino group the attachment may be from the aryl or heteroaryl group or from a substituent thereon, or E is an acetoacetamidoaryl group wherein the aryl moiety is optionally substituted and wherein the azo linkage in the formula (IV) is linked to the methylene group of the acetoacetamidoaryl group and when E is attached to the triazinylamino group the attachment may be from the aryl moiety or from a substituent thereon.
Still more preferably,
the group E is attached to the triazinylamino group in formula (I);
A is a phenyl or naphthyl group, optionally substituted by at least one of an alkyl, halo, cyano, hydroxy, aryloxy, alkylsulphonyl or arylsulphonyl group or a carboxylic or sulphonic acid group or salt thereof; and
E is as aryl or heteroaryl group selected from phenyl, naphthyl, pyrazolyl, pyrazolonyl, pyridyl, pyridonyl and pyrimidinyl groups or is an acetoacetamidoaryl group;
which said aryl or heteroaryl group or aryl moiety of the acetoacetamidoaryl group is optionally substituted by an alkyl, phenyl, naphthyl or amino- (which may bear a $C_{1-4}$ alkyl group), amido- or sulphonamido-phenyl or naphthyl group and E may be attached to the triazinylamino group from the said substituted alkyl group, phenyl or naphthyl group or phenyl or naphthyl moiety of the said substituent;
which said aryl or heteroaryl group is further optionally substituted at least so as to provide the coupling component from which the group E is derived, with sufficient electron donating capacity to allow the coupling;
which said aryl moiety of the acetoacetamidoaryl group is optionally substituted, preferably by at least one of alkyl, alkoxy, halo, $H_2NCONH$, $CH_3CONH$ or $SO_3H$ (or a salt thereof), more preferred alkyl and alkoxy being $C_{1-4}$ alkyl and $C_{1-4}$ alkoxy; and
when A is an α-naphthol, which dye is optionally metallized.

The group E may be a pyrazolyl, pyrazolonyl, pyridyl, pyridonyl or pyrimidinyl group and is substituted by a hydroxyl, mercapto or amino group, which amino group is optionally substituted by at least one alkyl group.

However, more preferably, the group E is a phenyl or naphthyl group optionally substituted by an alkyl, alkoxy, ureido, acylamino, alkylsulphonyl, halo, hydroxyl or amino group, which amino group is optionally substituted by at least one alkyl group, or is a carboxylic or sulphonic acid group or a salt thereof. In these groups, the alkyl groups or moiety is preferably a $C_{1-4}$ alkyl group.

In a still more preferred range of dyes, in at least one of $D^1$ and $D^2$, E is an optionally substituted phenylene group such as to provide, in the dye, at least one chromophore of the formula (V)

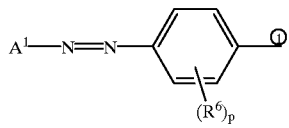

(V)

wherein:
$A^1$ is a phenyl or naphthyl group, optionally substituted by at least one of an alkyl, halo, cyano, hydroxy, aryloxy, alkylsulphonyl or arylsulphonyl group or a carboxylic or sulphonic acid group or salt thereof;
the or each $R^6$, independently, is alkyl (preferably $C_{1-4}$ alkyl), alkoxy (preferably $C_{1-4}$ alkoxy), halo, $H_2NCONH$, $H_3CCONH$ or $SO_3H$ (or a salt thereof); and
p is zero or is 1–4, preferably zero or 1–3, more preferably 1 or 2.

For the avoidance of doubt it is confirmed that, in the above formula (V) and in subsequent formulae the unsubstituted bond ① indicates a link to a triazinylamino in the formula (I)

In one especially preferred range of dyestuffs, at least one of $D^1$- and $D^2$- has the formula (VI)

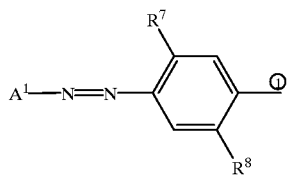

(VI)

wherein:

$A^1$ is as defined above;

$R^7$ is alkyl (preferably $C_{1-4}$ alkyl),alkoxy (preferably $C_{1-4}$ alkoxy), halo, $H_2NCONH$ or $H_3CCONH$; and $R^8$ is H, alkyl (preferably $C_{1-4}$ alkyl),alkoxy (preferably $C_{1-4}$ alkoxy) or halo.

Such chromophores tend to be yellow in colour.

Most preferably $R^7$ is $H_2NCONH$ and $R^8$ is hydrogen or $R^7$ is $CH_3CONH$ and $R^8$ is $CH_3O$.

In the above dyes $A^1$ is especially preferably a phenyl or naphthyl group substituted by at least one $SO_3H$ group, or a salt thereof.

In another preferred range of monoazo dyes, at least one and more preferably each of $D^1$ and $D^2$, independently, is a monoazo chromophore of the formula (VII)

   (VII)

wherein:

$A^1$ is as defined above; and $E^1$ is a hydroxy naphthyl group, optionally substituted by at least one sulphonic acid group or a salt thereof, and optionally additionally substituted by halo, preferably chloro, hydroxyl, methyl or acylamino (preferably a $C_{2-5}$ acylamino) group.

When each of $D^1$ and $D^2$ is a chromophore of the formula (VII) most dyes will be red or orange in colour.

More preferably, the group $A^1$ is substituted by at least one $SO_3H$ group or is a salt thereof, and also more preferably, the group $E^1$ is substituted by at least one group selected, independently, from $SO_3H$ (and salts thereof) and $CH_3$. Still more preferably, with reference to the formula (i) given and defined above, x is zero, y is 1 and b is 2 or 3.

In a more preferred range of dyes of the formula (VII), the group $E^1$ has the formula (VIII)

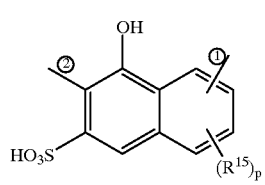   (VIII)

or has the formula (IX)

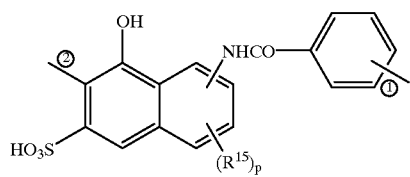   (IX)

wherein, in each of formula (VIII) and (IX), the or each $R^{15}$ is halogen, methyl, acylamino or $SO_3H$ or a salt thereof and p is as defined above; and the bond ② is attached to the monoazo group.

In a further alternative range of preferred dyes, each of $D^1$ and $D^2$ is a disazo chromophore, or a metallized derivative thereof. Such chromophores may yield, for example, dyes having an especially good deep blue or navy colour.

In one preferred range of disazo dyes, at least one and more preferably each of $D^1$ and $D^2$, independently, is a disazo chromophore of the formula (X)

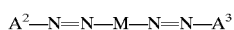   (X)

wherein one of $A^2$ and $A^3$ is attached to the triazinylamino group and each of $A^2$ and $A^3$, independently, is a phenyl or naphthyl group, optionally substituted by at least one group, independently, selected from sulphonic acid (or a salt thereof), carboxylic acid (or a salt thereof), alkyl, acylamino (preferably $C_{2-5}$acylamino and especially acetylamino), halo, alkylsulphonyl and alkylsulphonylamino groups (where each alkyl group or moiety is preferably $C_{1-4}$ alkyl); and M is a naphthalene group substituted by at least a hydroxyl and an amino group and optionally substituted by at least one sulphonic acid group.

Most of such chromophores will be navy in colour, as will a dye in which each of $D_1$ and $D_2$ is of the formula (X).

More preferably, M is a group of the formula (XI)

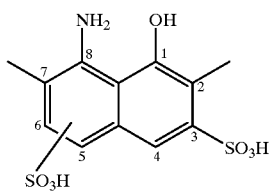   (XI)

where the sulphonic acid group in the 8-amino-substituted ring is in the 5- or 6-position.

In another preferred range of disazo dyes, at least one and more preferably each of $D^1$ and $D^2$, independently, is a disazo chromophore of the formula (XII)

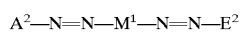   (XII)

wherein one of $A^2$, $M^1$ and $E^2$ is attached to the triazinylamino group;

$A^2$ is as defined above;

$M^1$ is an optionally substituted 1,4-phenylene or 1,4-naphthalene group; and $E^2$ is an optionally substituted 1,4-phenylene or 1,4-naphthalene group.

For each of $M^1$ and $E^2$ the optional substituent, independently, is preferably at least one group selected from an alkyl (preferably $C_{1-4}$alkyl), alkoxy (preferably $C_{1-4}$alkoxy), halo (preferably chloro) and an acylamino (preferably $C_{2-5}$acyl) group and a sulphonic acid group and a salt thereof.

Most of such chromophores will be brown in colour, as will a dye in which each of $D_1$ and $D_2$ is of the formula (XII).

More preferably, each of $M^1$ and $E^2$, independently, is a group of the formula (XIII)

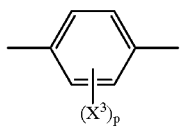   (XIII)

wherein the or each $X^3$, independently, is alkyl, alkoxy, acetylamino or alkylsulphonylamino (and each alkyl group or moiety is preferably $C_{1-4}$alkyl), and p is zero or 1–4, more preferably zero or 1–3, still more preferably zero, 1 or2; or a group of the formula (XIV)

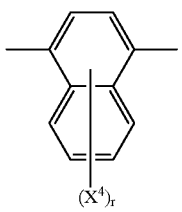

(XIV)

wherein the or each $X^4$, Independently, is alkyl (preferably $C_{1-4}$alkyl), alkoxy (preferably $C_{1-4}$alkoxy), halo, sulphonic acid (or a salt thereof) or carboxyl (or a salt thereof) and r is zero or 1–4, preferably zero or 1–3, still more preferably zero, 1 or 2.

A dye in accordance with the invention may be prepared by a process which, comprises reacting an arylazo diamine of the formula (XV)

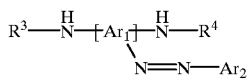

(XV)

wherein each of $Ar_1$, $Ar_2$, $R^3$ and $R^4$ is as defined above, with an equimolar proportion of each of two reactive dyes respectively of the formula

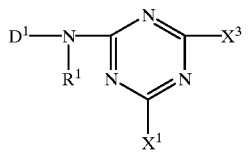

(XVI)

wherein each of $D^1$, $R^1$ and $X^1$ is as defined above and $X^3$ is a labile atom or group capable of reaction with an amine and

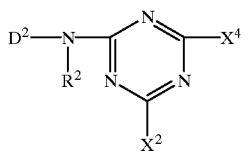

(XVII)

wherein each of $D^2$, $R^2$ and $X^2$ is as defined above and $X^4$ is a labile atom or group capable of reaction with an amine, or when each of $D^1$, $D^2$, $X^1$ and $X^3$ is the same as $D^2$, $R^2$, $X^2$ and $X^4$ respectively, with two moles of a reactive dye of the formula (XVI) or (XVII) per mole of the diamine of the formula (XV), to obtain the dye of the formula (I).

The reactive dye (XVI) or (XVII) containing a chromophore (V) or (VII) may be prepared, for example, by diazotizing a diamine component having one protected amine, coupling it to the coupling component, releasing the protected amine, then reacting the resultant dyestuff with a cyanuric halide, especially cyanuric chloride or fluoride. Alternatively, a diamine containing one hindered and one unhindered amine groups may be allowed to react with one equivalent of the cyanuric halide and the resultant product diazotized and coupled to the coupling component.

Preferred starting materials for providing, in a dye embodying the invention, a chromophore of the formula (V) or (VII) are (1) a diazotizable amine component capable of diazotization and coupling to a coupling component and (2) a coupling component to which the diazotized amine component can couple and also containing an amino group for reaction with a cyanuric halide, especially cyanuric chloride or fluoride, for attachment of the chromophore to the triazinylamino group.

Suitable diazo components for each of the chromophores of the formulae (V) and (VII) are, for example, aniline, orthanilic acid, metanilic acid and sulphanilic acid, 2-aminobenzene-1,4-disulphonic acid, 2-aminobenzene-1,5-disulphonic acid, 2-amino-5-methylbenzene-1-sulphonic acid, 2-amino-5-methoxybenzene-1-sulphonic acid, 2-aminobenzoic acid and 3-chloro-4-aminobenzene-1-sulphonic acid and α-and β-naphthylamines substituted by at least one of sulphonic acid, carboxylic acid, halo, alkyl (especially $C_{1-4}$ alkyl), acylamino (especially $C_{2-5}$acylamino), cyano and aminoalkyl (especially amino $C_{1-4}$alkyl), such as 2-aminonaphthalene-1-sulphonic acid, 2-aminonaphthalene-1,5-disulphonic acid, 2-aminonaphthalene-4,8-disulphonic acid and 2-aminonaphthalene-3,6,8-trisulphonic acid.

Suitable coupling components for the yellow chromophore of the formula (V) are, for example, 3-ureidoaniline, 3-acetylaminoaniline and 2,5-disubstituted anilines in which one of the respective substituents, independently, are selected from methyl, methoxy and halo (especially chloro) and the other from methyl and methoxy.

Suitable coupling components for the red or orange chromophores of the formula (VII) are, for example, 1-amino-8-hydroxynaphthalene-3,6-disulphonic acid(H-acid), 1-amino-8-hydroxynaphthalene-2,6-disulphonic acid (K-acid), 2-amino-8-hydroxynaphthalene-6-sulphonic acid (γ-acid) or the corresponding N-methyl derivative (Me-γ-acid), 3-amino-8-hydroxynaphthalene-6-sulphonic acid(J acid) or the corresponding N -methyl derivative (Me-J-acid), 2-amino-8-hydroxynaphthalene-3,6 -disulphonic acid, (2R- or sulpho-γ-acid) and 3-amino-8-hydroxynaphthalene-4,6-disulphonic acid (sulpho-J-acid).

Preferred starting materials for providing a chromophore of the formula (X) are (1) a first diazotizable amino component for diazotization and coupling to provide whichever of the groups $A^2$ and $A^3$ is to provide a terminal end of the dye remote from a triazinylamino group, (2) a second diazotizable amino component having one amino group (or a group capable of conversion to an amino group) for diazotization and coupling to provide whichever of the groups $A^2$ and $A^3$ is to react with a cyanuric halide, especially cyanuric chloride or fluoride, and additionally having another amino group (or a group capable of conversion to an amino group) for reaction with the cyanuric halide and (3) a coupling component to provide the group M.

Especially preferred coupling components for providing the group M are 1-hydroxy-8-amino-naphthalene-3,5- and 3,6-disulphonic acid (K and H acids respectively).

Suitable amine compounds (1) for diazotization to provide the terminal group are aniline, anthranilic acid, sulphanilamide and aniline mono- and disulphonic acids, for example, orthanilic, metanilic and sulphanilic acids, 1-amino-2,4disulphonic acid, 1-amino-2,5-disulphonic acid, 2-amino-5-methylbenzene-sulphonic acid, 2-amino-4-methyl benzenesulphonic acid, 2-chloro-4-amino benzenesulphonic acid, 2-amino-3-chloro-1,5-disulphonic acid, 2-amino-1,5-disulphonic acid, 1-amino-3-(β-sulphatoethylsulphonyl)benzene and 1-amino-4-(β-sulphatoethylsulphonyl) benzene, and α- or β-naphthylamines having up to 4 substituents, for example, 2-aminonaphthalene-1,5-disulphonic acid, 2-aminonaphthalene-4,8-disulphonic acid and 2-aminonaphthalene -3,6,8-trisulphonic acid.

Suitable diamines (2) for, on the other hand, reaction with cyanuric chloride followed by diazotization and coupling are 2,4-diaminobenzene-1-sulphonic acid, 2,5-diaminobenzene-1-sulphonic acid, and 2-amino-5-aminomethyinaphthalene-1-sulphonic acid.

Preferred starting materials for providing a chromophore of the formula (XII) are (1) a diazotizable amine component for diazotization and coupling to provide the group $A^3$, (2) an amine compound for providing the group $M^1$ onto which the diazotized amine compound (1) is to be coupled and which in turn is to be diazotized and coupled to a coupling component and (3) a coupling component. Whichever of components (1)–(3) is to react with a cyanuric halide, especially cyanuric chloride or fluoride, for attachment of the chromophore to the triazinylamino group will have an amino group for reaction with the cyanuric halide.

Suitable diazotizable amine components (1) for diazotization to provide the group $A^3$ are those given above with reference to the formula (X).

Suitable diazotizable amine components (2) to which the diazotized amine components (1) are coupled and which can be further diazotized are aniline, 2- or 3-methyl aniline, 2,5-dimethyl aniline, 2,5dimethoxy aniline, 2-methyl-5-methoxy aniline, 3-aminoacetanilide and 1-aminonaphthalene-6 and -7-sulphonic acids.

When coupling component (3) is the component for further reaction with the cyanuric halide, preferred such coupling components are 2,5-dimethyl aniline and 1-aminonaphthalene-6-, and -7- and -8- sulphonic acids.

The arylazo diamine of the formula (XV) may be prepared by diazotising an amine of the formula (XVIII)

  (XVIII)

wherein $Ar_2$ is an aryl group, and coupling the diazotized amino of the formula (X) to a diamine of the formula (XIX)

  (XIX)

wherein each of $Ar_1$, $R_3$ and $R_4$ is as defined above.

Preferred diazotizable amines of the formula (XVIII) are any of those given for the first diazotizable amino component (1) for $A^2$ or $A^3$ in formula (X), remote from the triazinylamino group. Especially preferred are p-(β-sulphatoethylsulphonyl)aniline, 2-aminonaphthalene4,8-disulphonic acid and 2-amino-3,6,8-trisulphonic acid.

Preferred diamines of the formula (XIX) are m-phenylendiamine, p-phenylenediamine, 4-chloro-1,3-phenylenediamine, 3,5-diaminobenzenesulphonic acid, 4-methoxy-1,3-phenylenediamine, 2,6-diaminotoluene-4-sulphonic acid, 2,4-diaminoacetanilide, 2,6-diaminonaphthalene4,8-disulphonic acid, 2,5-diaminobenzoic acid and 3,5-diaminobenzoic acid.

Although in this specification, dye formulae have been shown in the form of their free acid, the invention also includes dyes and processes using dyes in the salt form, particularly their salts with alkali metals such as the potassium, sodium, lithium or mixed sodium/lithium salt.

The dyes may be used for dyeing, printing or ink-jet printing, for example of textile materials and paper.

The process for colouration is preferably performed at a pH of 7.1 to 13, more preferably 10 to 12. pH levels above 7 can be achieved by performing the process for colouration in the presence of an acid-binding agent.

The substrate may be any of a textile material, leather, paper, hair or film, but is preferably a natural or artificial textile material containing amino or hydroxyl groups, for example textile material such as wool, silk, polyamides and modified polyacrylonitrile fibres, and more preferably a cellulosic textile material, especially cotton, viscose and regenerated cellulose, for example, that commercially available as Tencel. For this purpose the dyes can be applied to the textile materials at a pH above 7 by, for example, exhaust dyeing, padding or printing. Textile materials are coloured bright shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid-binding agent.

Preferred acid-binding agents include alkali metal carbonates, bicarbonates, hydroxides, metasilicates and mixtures thereof, for example sodium bicarbonate, sodium carbonate, sodium metasilicate, sodium hydroxide and the corresponding potassium salts. The dyes benefit from excellent build-up and high fixation.

At least for cellulosic materials, dyeing may be carried out at a somewhat higher temperature of about 90° C., as compared with dyeing carried out with conventional monochlorotriazine exhaust dyes which are generally dyed at temperatures of about 80° C. Although more energy is required, particularly improved migration is obtained.

The new dyes can be applied to textile materials containing amine groups, such as wool and polyamide textile materials, from a neutral to mildly alkaline dyebath. The dyeing process can be carried out at a constant or substantially constant pH, that is to say the pH of the dyebath remains constant or substantially constant during the dyeing process, or if desired the pH of the dyebath can be altered at any stage of the dyeing process.

The dyes may be in liquid or solid form, for example in granular or powdered form.

We find surprisingly that such dyes provide the following advantageous properties:
a) excellent build-up;
b) very strong dyeing;
c) good robustness to changes in dyeing conditions, especially temperature;
d) good wash off;
e) good fixation; and
f) good aqueous solubility.

Especially preferred embodiments of the invention will now be described in more detail with reference to the following Examples in which all parts and percentages are by weight unless otherwise stated. Although preparation and dyeing with any single dye is exemplified, particular advantages can be seen when dyeing with mixtures of dyes.

EXAMPLE 1

2N Sodium nitrite (27.5 mls) was added dropwise to a slurry of para-aminobenzene-β-sulphatoethylsulphone (14.05 g, 0.05 mol) in ice water (30 mls) containing conc. HCl (6 mls) maintained below 10° C. After 1 hr, excess nitrous acid was destroyed by the addition of sulphamic acid, leaving a solution of a diazonium salt.

Meta-phenylenediamine (5.4 g 0.05 mol) was dissolved in water (100 mls) at pH4 and the above solution of the diazonium salt was added portionwise maintaining the pH at 4. After complete addition the mixture was stirred for a further 1 hr. The resulting precipitate was filtered off and dried to give a monoazo dye (7) containing a linking diamine (17.5 g). Analytical data were in full agreement with the expected structure (7).

An aqueous solution of a yellow dye (6) (0.03 mol) and the dye (7) containing the diamine (0.015 mol) in water (400 mls) was adjusted to pH 6 and heated at 50° C. maintaining pH6 by the addition of 2N $Na_2CO_3$ for 48 hrs. The mixture was then concentrated in vacuo and the dye precipitated by the addition of methylated spirits. The precipitate was filtered off and dried to give a reactive dyestuff (1) (24.6 g); $\lambda max = 426$ nm $\epsilon = 75000$.

Analytical data were in full agreement with the expected structure (1).

The above reaction may be represented by:

0.055 mol) were mixed and the resulting solution added dropwise to a stirred mixture of ice/water (100 mls) and concentrated HCl (10 mls). After two hours excess nitrous acid was destroyed by the addition of sulphamic acid leaving a solution of the diazonium salt.

Meta-phenylene diamine (5.4 g, 0.05 mol) was dissolved in water (50 mls) at pH4 and the resulting solution added slowly to the solution of the diazonium salt maintaining the pH at 4 by the addition of 2N sodium carbonate. After two hours the resulting precipitate was filtered off and dried to give the monoazo diamine (9) (26 g). Analytical data were in full agreement with the expected structure.

An aqueous solution of yellow dye (8) (0.02 mol) and diamine (9) (0.01 mol) in water (1200 mls) at pH7 was heated at 50° C. for five hours, the pH being maintained by the addition of 2N sodium carbonate. The mixture was then concentrated in vacuo and the dye precipitated by the addition of methylated spirit. The precipitate was filtered off and dried to give reactive dye (2) (21 g) $\lambda max = 428$ nm $\epsilon = 64760$. Analytical data were in full agreement with the expected structure.

The above reaction may be represented by:

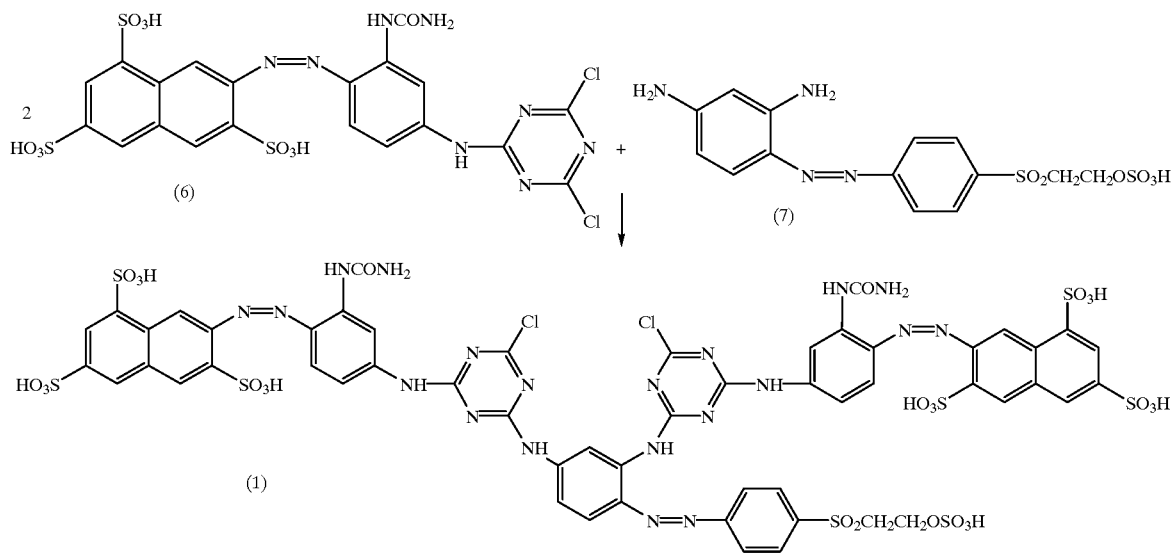

EXAMPLE 2

7-Amino naphthalene trisulphonic acid (28.4 g, 0.05 mol) in water (300 mls) and 2N sodium nitrite solution (27.5 mls,

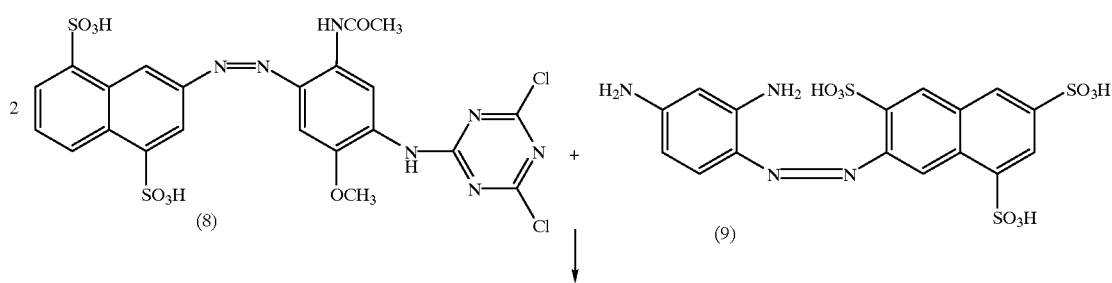

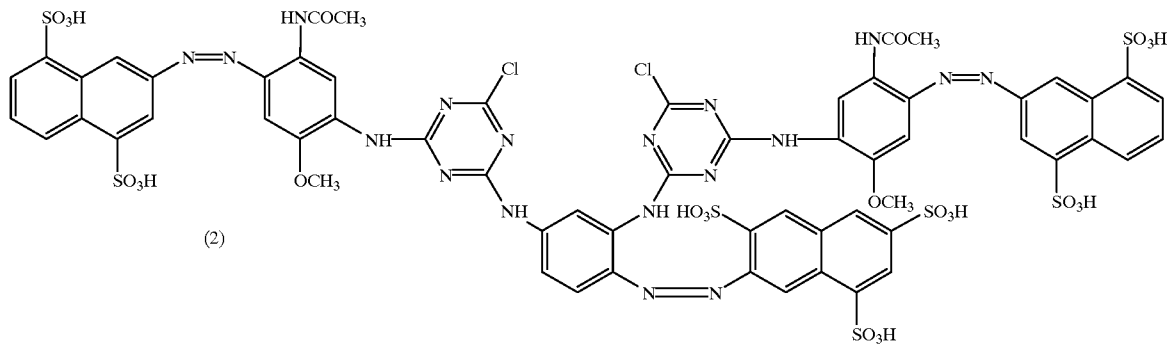

(2)

EXAMPLE 3

A solution of yellow dye (10) (0.02 mol) and diamine (11) (0.01 mol) in water (100 mls) was heated to 55° C. and maintained at pH 7 for four and a half hours, maintaining the pH by the addition of 2N sodium carbonate. The mixture was then concentrated in vacuo and the dye precipitated by the addition of methylated spirits. The precipitate was filtered off and dried to give reactive dye (3) (16 g) λmax=464 nm ε=64300. Analytical data were in full agreement with the expected structure.

The above reaction may be represented by:

EXAMPLE 4

An aqueous solution of the red dye (12) (0.009 mol) and the monoazo linking diamine (13) (0.0045 mol) in water (200 mls) was adjusted to pH6 and heated at 50° C. for ten hours maintaining pH6 by the addition of 2N $Na_2CO_3$. The dye was precipitated by the addition of methylated spirits and the precipitate filtered off and dried to give a yellowish red reactive dyestuff (4) (6.1 g) λmax=508 nm ε=41300. All analytical data were in full agreement with the expected structure (4).

The above reaction may be represented by:

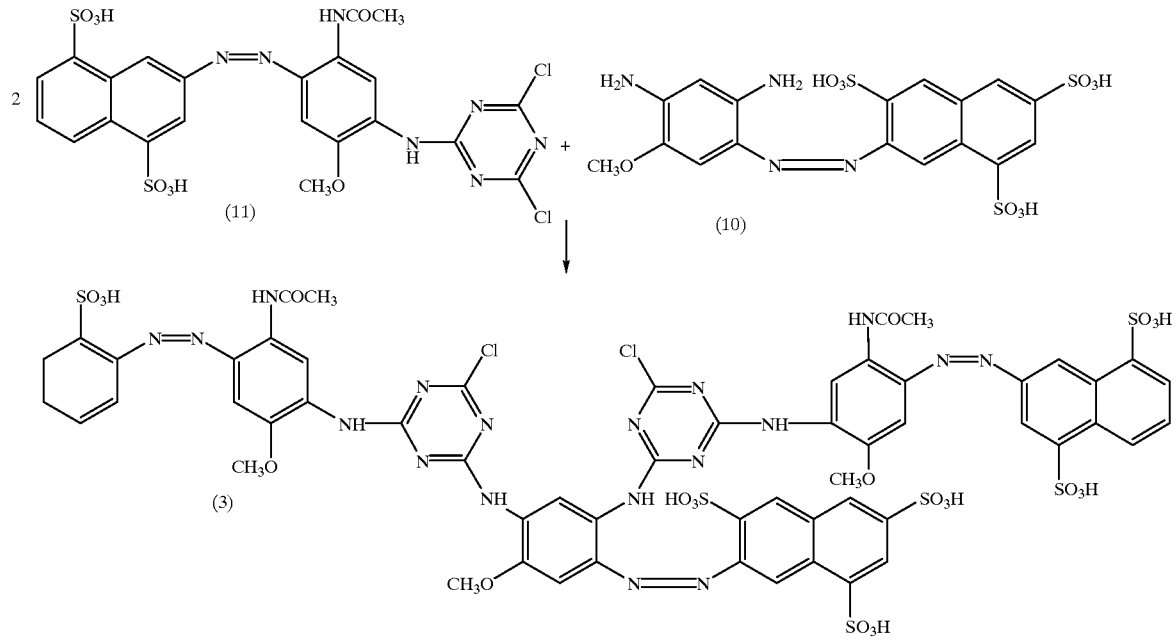

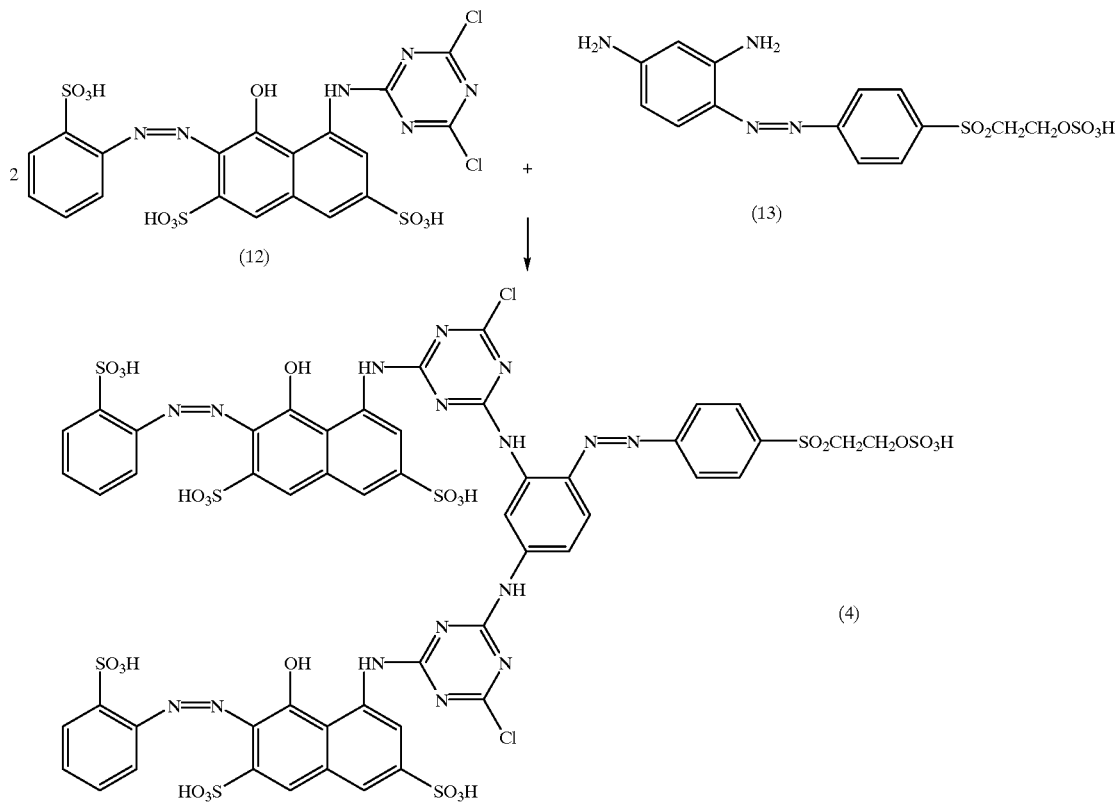

EXAMPLE 5

An aqueous solution of the navy dye (14) (0.02 mol) and the monoazo linking diamine (15) (0.01 mol) in water (400 mls) was adjusted to pH 6.5 and heated at 55° C. for thirty hours maintaining pH 6.5 by the addition of 2N sodium carbonate solution. The dye was precipitated by the addition of methylated spirits and the precipitate filtered off and dried to give greenish-navy reactive dyestuff (5) (18.3 g) $\lambda$max= 623 nm $\epsilon$=98640 $\lambda\frac{1}{2}$=101 nm, All analytical data was in full agreement with the expected structure (5).

The above reaction may be represented by:

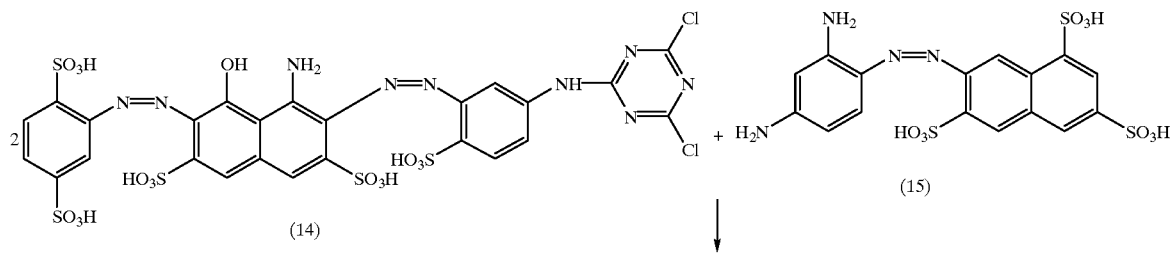

-continued

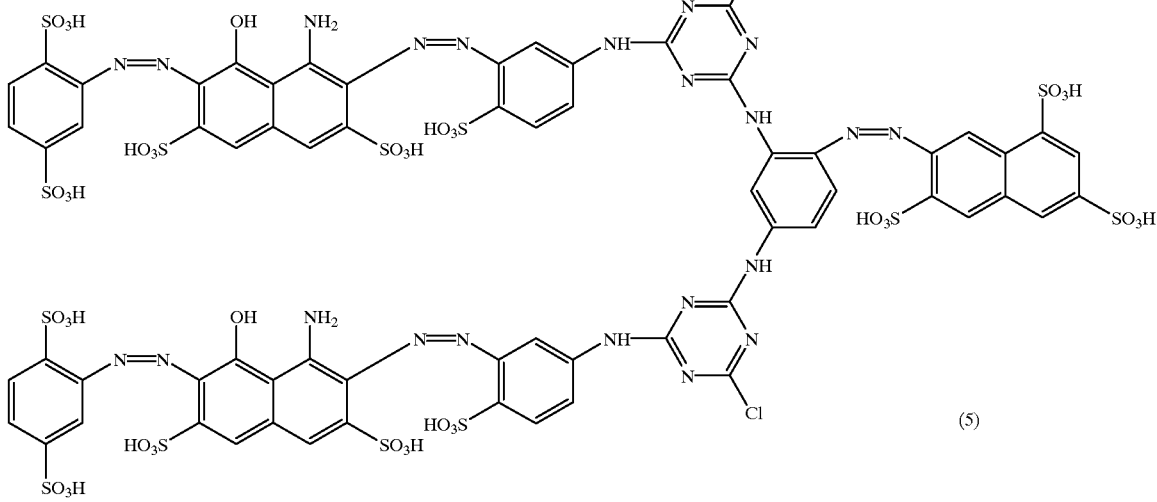

(5)

EXAMPLES 6–8

Each of the dyes prepared in Examples 1–5 was applied to cotton by exhaust dyeing at 90° C. at a liquor:goods ratio of 10:1 and in the presence of salt and soda ash. In each case, the dye was found to have excellent build-up, extremely high fixation efficiency and good fastness properties.

What is claimed is:

1. A dye of the formula (I)

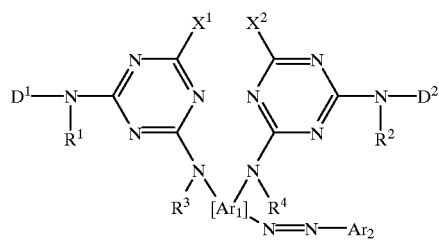

(I)

wherein:
- $Ar_1$ is an optionally substituted arylene group;
- each of $D^1$ and $D^2$, independently, is a chromophoric group;
- $Ar_2$ is an optionally substituted aryl group;
- each of $R^1$, $R^2$, $R^3$ and $R^4$, independently, is H or alkyl; and
- each of $X^1$ and $X^2$, independently, is a labile atom or group.

2. A dye according to claim 1, wherein each of $X^1$ and $X^2$, independently, is a halogen atom or a pyridinium salt.

3. A dye according to claim 2, wherein each of $X^1$ and $X^2$, independently, is F or Cl.

4. A dye according to claim 3, wherein each of $X^1$ and $X^2$, independently, is Cl.

5. A dye according to claim, wherein each of $R^1$, $R^2$, $R^3$ and $R^4$, independently, is H or $C_{1-5}$ alkyl.

6. A dye according to claim 5, wherein each of $R^1$, $R^2$, $R^3$ and $R^4$, independently, is hydrogen, methyl, ethyl or n- or i-propyl.

7. A dye according to claim 1, wherein $Ar_1$ is an optionally substituted phenylene, naphthylene or diphenylene group.

8. A dye according to claim 7, which dye has the formula (II)

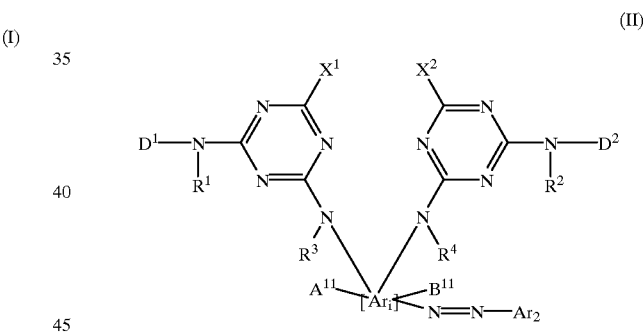

(II)

wherein:
- $Ar_1$ is phenylene, naphthylene or diphenylene group;
- each of $A^{11}$ and $B^{11}$, independently, is optionally present and is a halogen atom, an alkoxy group, a hydroxy group or a sulphonic acid group or salt thereof;
- each of $D^1$ and $D^2$, independently, is a chromophoric group;
- $Ar_2$ is an optionally substituted aryl group;
- each of $R^1$, $R^2$, $R^3$ and $R^4$, independently, is H or alkyl; and
- each of $X^1$ and $X^2$, independently, is a labile atom or group.

9. A dye according to claim 8, which dye has the formula (III)

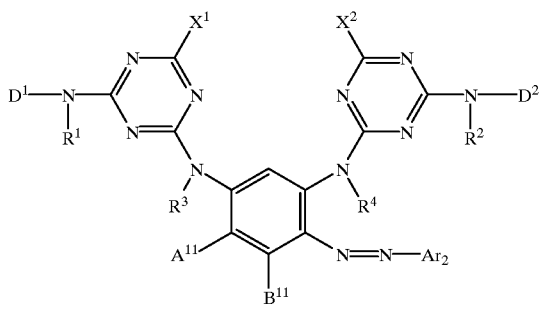

(III)

wherein each of $D^1$ and $D^2$, independently, is a chromophoric group;

Ar$_2$ is an optionally substituted aryl group;

each of $R^1$, $R^2$, $R^3$ and $R^4$, independently, is H or alkyl;

each of $X^1$ and $X^2$, independently, is a labile atom or group; and each or $A^{11}$ and $B^{11}$, independently, is optionally present and is a halogen atom, an alkoxy group, a hydroxy group or a sulphonic acid group or a salt thereof.

10. A dye according to claim 8, wherein Ar$_2$ is an optionally substituted phenyl group.

11. A dye according to claim 10, wherein Ar$_2$ is a phenyl group substituted by a vinylsulphone group or a precursor thereof.

12. A dye according to claim 11, wherein Ar$_2$ is a phenyl group substituted by a precursor of the vinylsulphone group.

13. A dye according to claim 12, wherein the precursor is a β-sulphatoethylsulphone or a β-acyloxyethylsulphone.

14. A dye according to claim 12, wherein the precursor is allylsulphone.

15. A dye according to claim 1, wherein each of $D^1$ and $D^2$, independently, is an optionally metallized monoazo chromophore of the formula (IV)

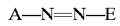  (IV)

wherein one of A and E is attached to the reactive triazinylamino group;

A is derived from a diazotizable amine; and

E is derived from a coupling component.

16. A dye according to claim 15, wherein

A is an optionally substituted aryl group and when A is attached to the triazinylamino group the attachment may be from the aryl group or from a substituent thereon;

E is an optionally substituted aryl or heteroaryl group and when E is attached to the triazinylamino group the attachment may be from the aryl or heteroaryl group or from a substituent thereon, or E is an acetoacetamidoaryl group wherein the aryl moiety is optionally substituted and wherein the azo linkage in the formula (IV), given and defined in claim 15, is linked to the methylene group of the acetoacetamidoaryl group and when E is attached to the triazinylamino group the attachment may be from the aryl moiety or from a substituent thereon.

17. A dye according to claim 16, wherein the group E is attached to the triazinylamino group in formula (I), A is a phenyl or naphthyl group, optionally substituted by at least one of an alkyl, halo, cyano, hydroxy, aryloxy, alkylsulphonyl, or arylsulphonyl group or a carboxylic or sulphonic acid group or salt thereof; and E is as aryl or heteroaryl group selected from phenyl, naphthyl, pyrazolyl, pyrazolonyl, pyridyl, pyridonyl, and pyrimidinyl groups or is an acetoacetamidoaryl group;

which said aryl or heteroaryl group or aryl moiety of the acetoacetamidoaryl group is optionally substituted by an alkyl, phenyl, naphthyl or amino- (which may bear a $C_{1-4}$ alkyl group), amino- or sulphonamido-phenyl or naphthyl group and E may be attached to the triazinylamino group from the said substituted alkyl group, phenyl or naphthyl group or phenyl or naphthyl moiety of the said substituent;

which said aryl or heteroaryl group is further optionally substituted at least so as to provide the coupling component from which the group E is derived with sufficient electron donating capacity to allow the said coupling;

which said aryl moiety of the acetoacetamidoaryl group is optionally substituted; and when A is an α-naphthol, which dye is optionally metallized.

18. A dye according to claim 17, wherein the group E is a phenyl or naphthyl group optionally substituted by an alkyl, alkoxy, ureido, acylamido, alkylsulphonyl, halo, hydroxyl or amino group, which amino group is optionally substituted by at least one alkyl group, or is a carboxylic or sulphonic acid group or a salt thereof.

19. A dye according to claim 17, wherein the group E is a pyrazolyl, pyrazolonyl, pyridyl, pyridonyl or pyrimidinyl group and is substituted by a hydroxyl, mercapto or amino group, which amino group is optionally substituted by at least one alkyl group.

20. A dye according to claim 17 wherein, in at least one of $D^1$ and $D^2$, E is an optionally substituted phenylene group such as to provide, in the dye, at least one chromophore of the formula (V)

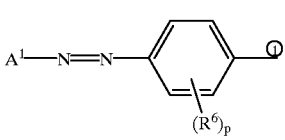  (V)

wherein;

$A^1$ is a phenyl or naphthyl group, optionally substituted by at least one of an alkyl, halo, cyano, hydroxy, aryloxy, alkylsulphonyl or arylsulphonyl group or a carboxylic or sulphonic acid group or salt thereof;

the or each $R^5$, independently, is alkyl, alkoxy, halo, $H_2NCONH$, $H_3CCONH$ or $SO_3H$ (or a salt thereof);

p is zero or is 1–4; and the unsubstituted bond ① indicates a link to triazinylamino group in the formula (1).

21. A dye according to claim 20, wherein p is zero or is 1, 2 and 3.

22. A dye according to claim 21, wherein p is 1 or 2.

23. A dye according to claim 22, wherein each of $D^1$- and $D^2$-, independently, is of the formula (VI)

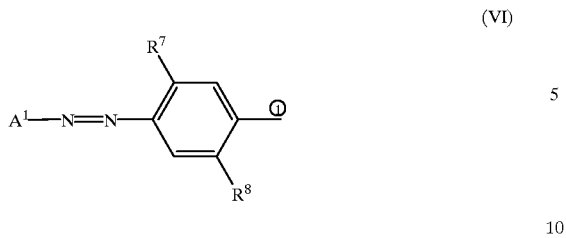

wherein:

A¹ is derived from a diazotizable amine;

$R^7$ is alkyl, alkoxy, halo, $H_2NCONH$ or $H_3CCONH$; and $R^8$ is H, alkyl, alkoxy or halo.

24. A dye according to claim 23, wherein $R^7$ is $H_2NCONH$ and $R^8$ is H or $R^7$ is $CH_3CONH$ and $R^8$ is $CH_3O$.

25. A dye according to claim 23, wherein A¹ is a phenyl or naphthyl group substituted by at least one $SO_3H$ group, or a salt thereof.

26. A dye of the formula (1)

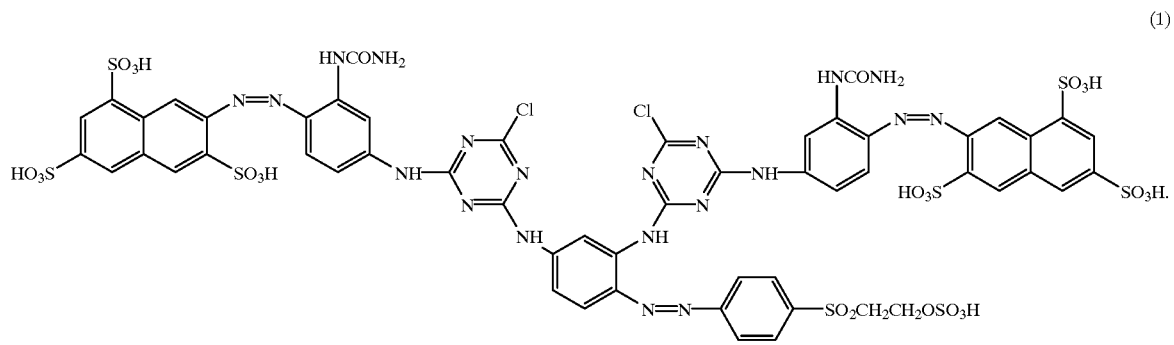

27. A dye of the formula (2)

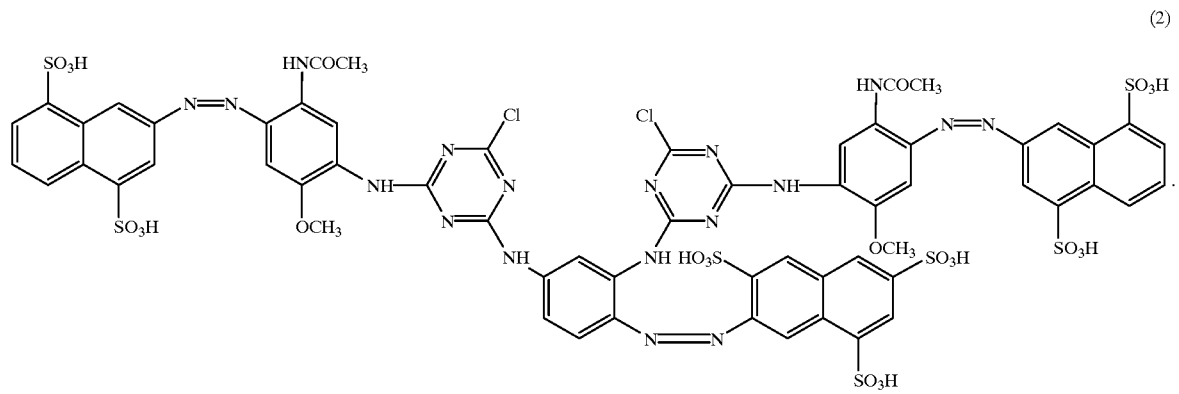

28. A dye of the formula (3)

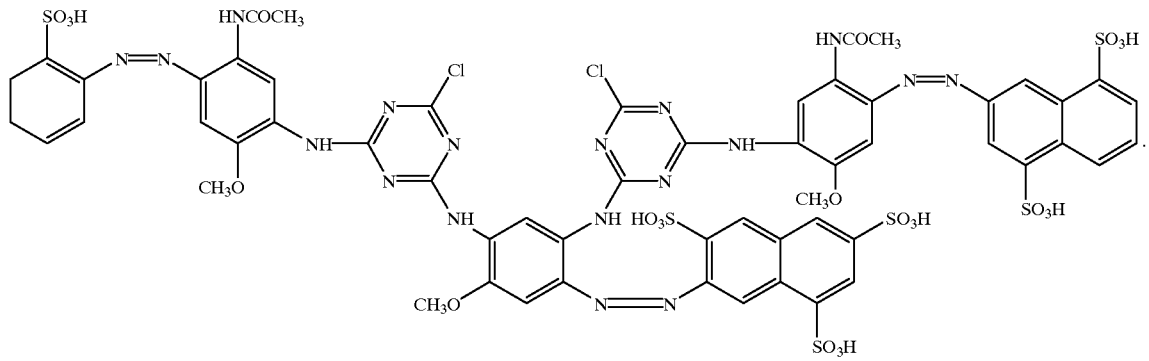

29. A dye according to claim 20, wherein E is a hydroxynaphthyl group optionally substituted by at least one sulphonic acid group or a salt thereof and optionally further substituted by a halogen atom, a hydroxyl group, a methyl group or an acylamino group.

30. A dye according to claim 29, wherein E is a hydroxynaphthyl group substituted by at least one sulphonic acid group or a salt thereof.

31. A dye according to claim 30, wherein the group E has the formula (VIII)

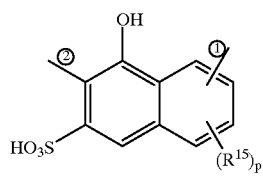

or has the formula (IX)

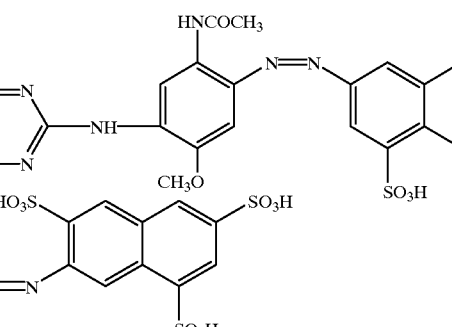

wherein in each formula (VIII) and (IX) the or each $R^{15}$ is halogen, methyl, acylamino or $SO_3H$ or a salt thereof and p is zero or is 1–4;

the bond ① indicates a link to a triazinylamino group in the formula (I); and the bond ② is attached to the monoazo group in the formula (V).

32. A dye of the formula (4)

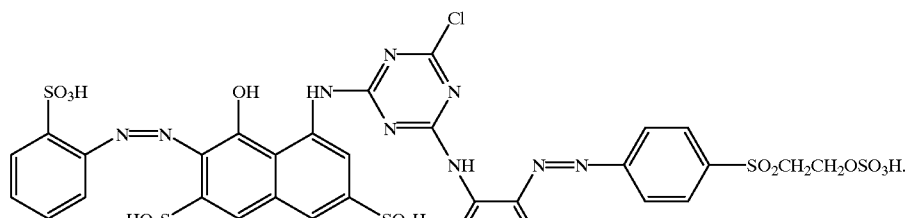

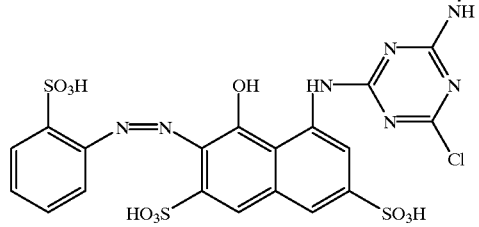

33. A dye according to claim 1, wherein each of $D^1$ and $D^2$, independently, is an optionally metallized disazo chromophore of the formula (X)

$$A^2-N=N-M-N=N-A^3 \qquad (X)$$

wherein one of $A^2$ and $A^3$ is attached to the triazinylamino group and each of $A^2$ and $A^3$, independently, is a phenyl or naphthyl group, optionally substituted by at least one group, independently, selected from sulphonic acid (or a salt thereof), carboxylic acid (or a salt thereof), alkyl, alkoxy, acylamino, halo, alkylsulphonyl and alkylsulphonylamino groups; and M is a naphthylene group substituted by at least a hydroxyl and an amino group and optionally substituted by at least one sulphonic acid group.

34. A dye according to claim 33, wherein M is a group of the formula (XI)

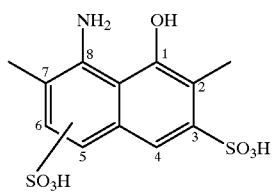

(XI)

wherein the sulphonic acid group in the 8-amino-substituted ring is in the 5- or 6-position.

35. A dye of the formula (5)

salt thereof), alkyl, alkoxy, acylamino, halo, alkylsulphonyl and alkylsulphonylamino groups;

$M^1$ is 1,4-phenylene or 1,4-naphthalene group, optionally substituted by at least one group selected from an alkyl, alkoxy, halo and arylamino group and a sulphonic acid group and a salt thereof; and $E^2$ is a 1,4-phenylene or 1,4-naphthalene group, optionally substituted by at least one group selected from an alkyl, alkoxy, halo and an arylamino group and a sulphonic acid group and a salt thereof.

37. A dye according to claim 36, wherein each of $M^1$ and $E^2$, independently, is a group of the formula (XIII)

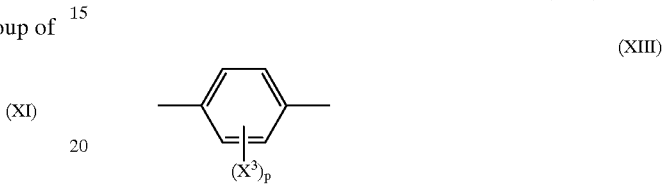

(XIII)

wherein the or each $X^3$, independently, is alkyl, alkoxy, acetylamino or alkylsulphonylamino or sulphonic acid group or salt thereof, and is zero or 1–4; or

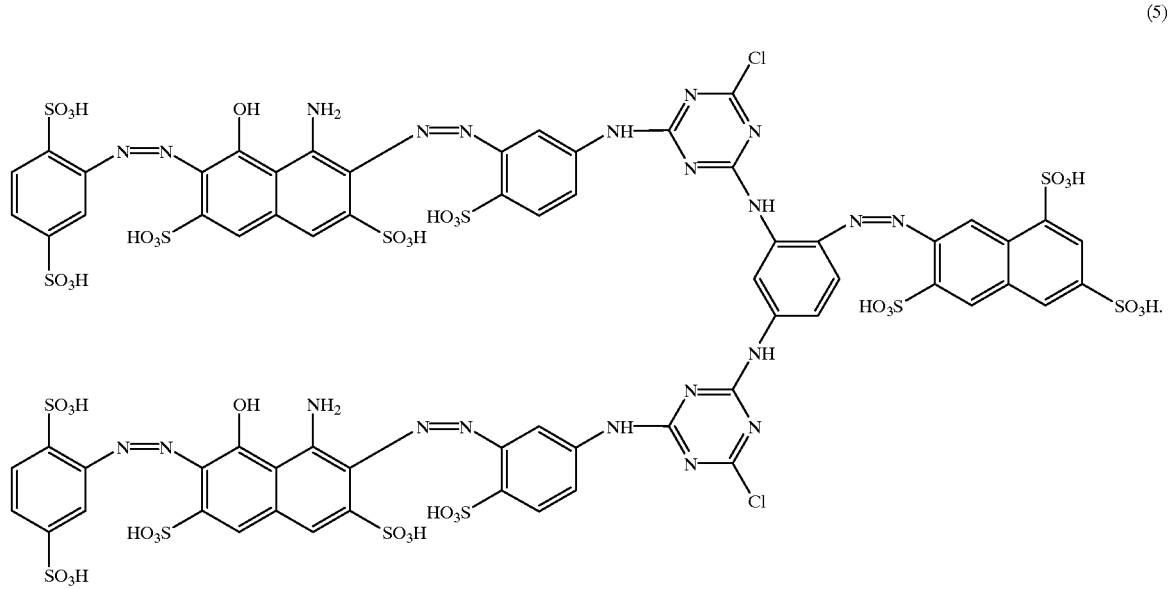

(5)

36. A dye according to claim 1, wherein each of $D^1$ and $D^2$, independently, is an optionally metallized disazo chromophore of the formula (XII)

$$A^2-N=N-M^1-N=N-E^2 \qquad (XII)$$

wherein one of $A^2$, $M^1$ and $E^2$ is attached to the triazinylamino group;

$A^2$ is a phenyl or naphthyl group, optionally substituted by at least one group, independently, selected from sulphonic acid (or a salt thereof), carboxylic acid (or a a group of the formula (XIV)

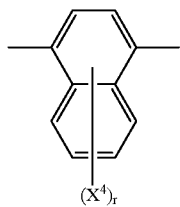

(XIV)

wherein the or each $X^4$, independently, is alkyl, alkoxy, halo, sulphonic acid (or a salt thereof) or carboxyl (or a salt thereof) and r is zero or 1–4.

38. A process for preparing a dye of the formula (I), given and defined in claim 1, which process comprises reacting an arylazodiamine of the formula (XV)

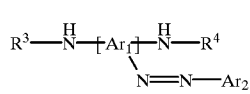

(XV)

wherein each of $Ar_1$, $Ar_2$, $R^3$ and $R^4$ is as defined in claim 1, with an equimolar proportion of each of two reactive dyes respectively of the formula

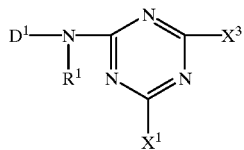

(XVI)

wherein each of $D^1$, $R^1$ and $X^1$ is as defined in claim 1 and $X^3$ is a labile atom or group capable of reaction with an amine and

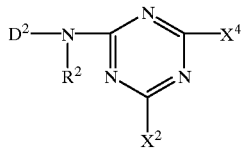

(XVII)

wherein each of $D^2$, $R^2$ and $X^2$ is as defined in claim 1 and $X^4$ is a labile atom or group capable of reaction with an amine, or when each of $D^1$, $D^2$, $X^1$ and $X^3$ is the same as $D^2$, $R^2$, $X^2$ and $X^4$ respectively, with two moles of a reactive dye of the formula (XVI) or (XVII) per mole of the diamine of the formula (XV), to obtain the dye of the formula (I).

* * * * *

UNITED STATES PATENT AND TRADEMARK OFFICE
CERTIFICATE OF CORRECTION

PATENT NO. : 6,180,765 B1
DATED : January 30, 2001
INVENTOR(S) : Warren J. Ebenezer It is certified that error appears in the above-identified patent and that said Letters Patent is hereby corrected as shown below:

Column 1,
Line 7, "GB-A-1 283771" should read -- GB-A-1283771 --.
Line 20, "optional" should read -- optionally --.
Line 56, "substitution" should read -- substituent --.

Column 2,
Line 38, "I-propyl" should read -- i-propyl. --.
Line 39, "$Ar_1$, be" should read -- -$Ar_1$ be --.
Lines 45-54, containing the chemical structure in formula (II),

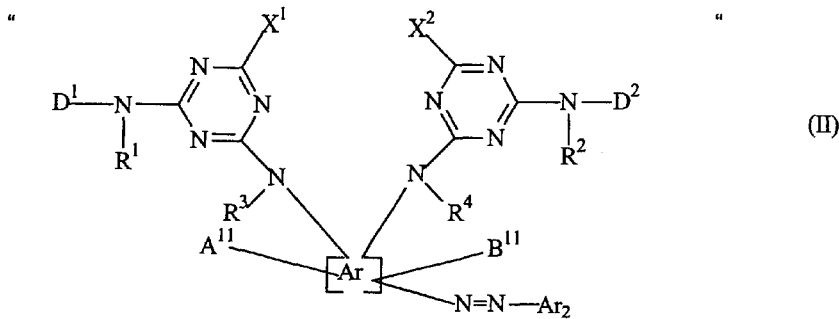

should read

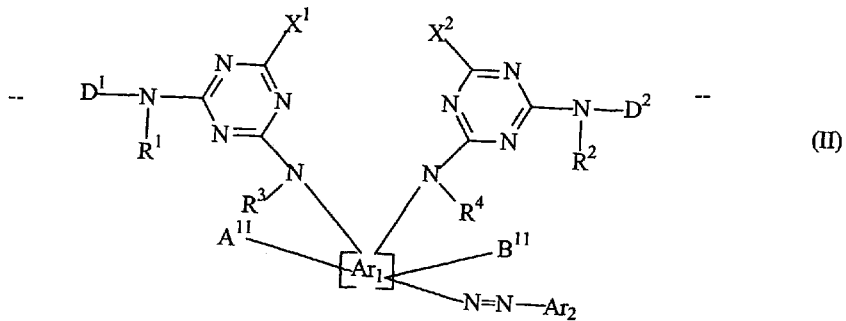

Column 3,
Line 19, "are" should read -- is --.
Line 37, "A Is" should read -- A is --.
Line 59, "as" should read -- an --.

UNITED STATES PATENT AND TRADEMARK OFFICE
CERTIFICATE OF CORRECTION

PATENT NO. : 6,180,765 B1
DATED : January 30, 2001
INVENTOR(S) : Warren J. Ebenezer It is certified that error appears in the above-identified patent and that said Letters Patent is hereby corrected as shown below:

<u>Column 4,</u>
Line 24, "groups" (second occurrence) should read -- group --.

<u>Column 5,</u>
Lines 30 & 31, "Still more preferably, with reference to the formula (i) given and defined above, x is zero, y is 1 and b is 2 or 3." should read -- --.

<u>Column 6,</u>
Line 14, "$D_1$ and $D_2$" should read -- $D^1$ and $D^2$ --.
Line 51, "$D_1$ and $D_2$" should read -- $D^1$ and $D^2$ --.

<u>Column 8,</u>
Line 1, "groups" should read -- group --.
Line 32, "are" should read -- is --.
Line 37, "1-amino-8-hydroxynaphthalene-2,6-disulphonic acid" should read
-- 1-amino-8-hydroxynaphthalene-4,6-disulphonic acid --.
Line 65, "1-amino-2,4disulphonic" should read -- 1-amino-2,4-benzene-disulphonic --.
Line 65, "1-amino-2,5-disulphonic" should read -- 1-aminno-2,5-benzene-disulphonic --.

<u>Column 9,</u>
Line 1, "2-amino-3-chloro-1,5-disulphonic" should read
-- 2-amino-3-chloro-1,5-benzene-disulphonic --.
Line 2, "2-amino-1,5-disulphonic acid," should read --  --.
Lines 12-13, "5-aminomethyinaphthalene-l-sulphonic" should read
-- 5-aminomethylnaphthalene-l-sulphonic --.
Line 31, "2,5dimethoxy" should read -- 2,5-dimethoxy --.
Line 44, "amino of the formula (X)" should read -- amine of the formula (XVIII) --.
Line 47, "$R_3N—Ar_1—NR_4$" should read -- - $R^3NH—Ar_1—NHR^4$ --.
Line 49, "$R_3$ and $R_4$" should read -- $R^3$ and $R^4$ --.
Line 61, "diaminonaphthalene4,8-disulphonic" should read
-- diaminonaphthalene-4,8-disulphonic --.

<u>Column 11,</u>
Example 2, "naphthalene trisulphonic" should read -- naphthalene-1,3,6-trisulphonic --.

UNITED STATES PATENT AND TRADEMARK OFFICE
CERTIFICATE OF CORRECTION

PATENT NO.    : 6,180,765 B1
DATED         : January 30, 2001
INVENTOR(S)   : Warren J. Ebenezer It is certified that error appears in the above-identified patent and that said Letters Patent is hereby corrected as shown below:

Column 13,
Line 19, "(10) (0.02 mol) and diamine (11)" should read
-- (11) (0.02 mol) and diamine (10) --.

Columns 13 and 14,
Lines 30 to page end,

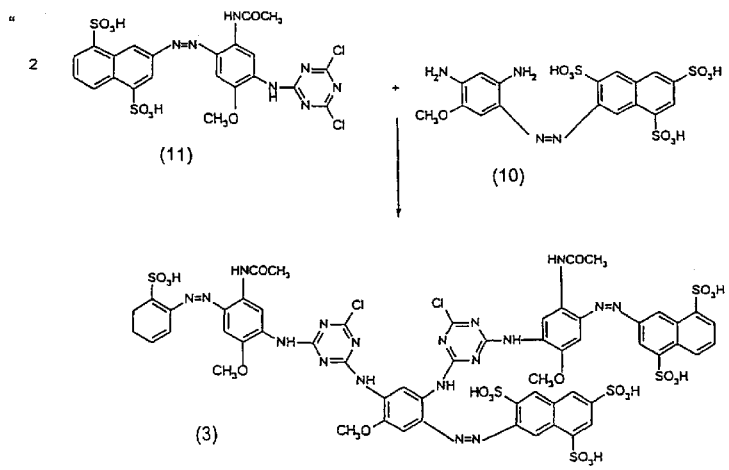

should read

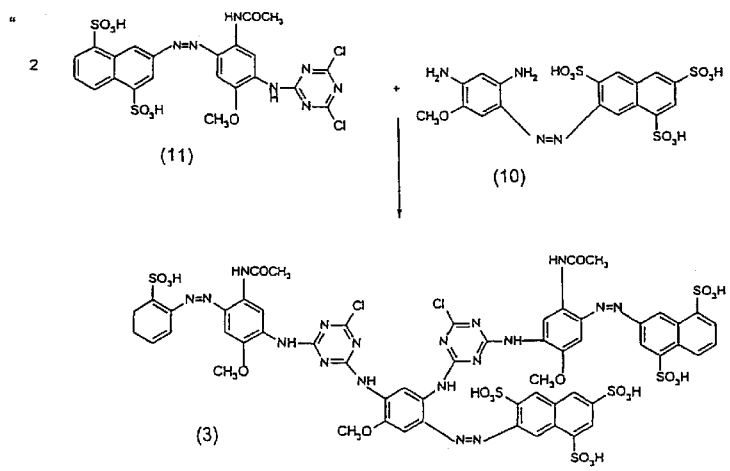

UNITED STATES PATENT AND TRADEMARK OFFICE
CERTIFICATE OF CORRECTION

PATENT NO.   : 6,180,765 B1
DATED        : January 30, 2001
INVENTOR(S)  : Warren J. Ebenezer It is certified that error appears in the above-identified patent and that said Letters Patent is hereby corrected as shown below:

Column 16,
Line 37, "was" should read -- were --.

Column 17,
Line 25, "EXAMPLES 6-8" should read -- EXAMPLES 6-10 --.
Line 59, "$X^2$," should read -- $X^2$ --.
Line 60, "independently," should read -- --.
Line 61, "claim," should read -- claim 1, --.

Column 18,
Lines 35-45, containing the formula (II) chemical structure,

"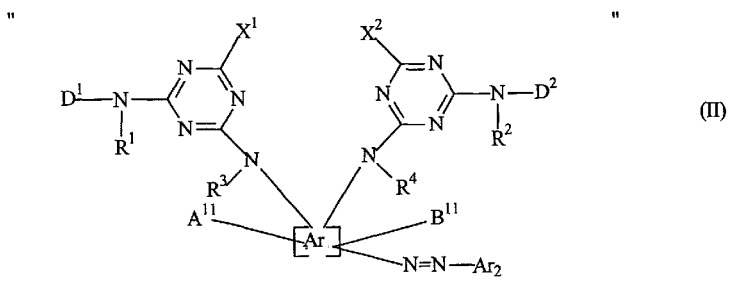"

should read

-- 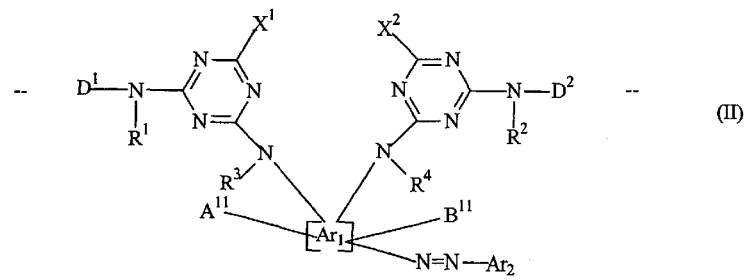 --     (II)

Column 20,
Line 5, "is as aryl" should read -- is an aryl --.
Line 64, "1, 2 and 3." should read -- 1, 2 or 3. --.

UNITED STATES PATENT AND TRADEMARK OFFICE
CERTIFICATE OF CORRECTION

PATENT NO. : 6,180,765 B1
DATED : January 30, 2001
INVENTOR(S) : Warren J. Ebenezer It is certified that error appears in the above-identified patent and that said Letters Patent is hereby corrected as shown below:

Columns 23 and 24,
Lines 1-18, containing the chemical structure in formula (3),

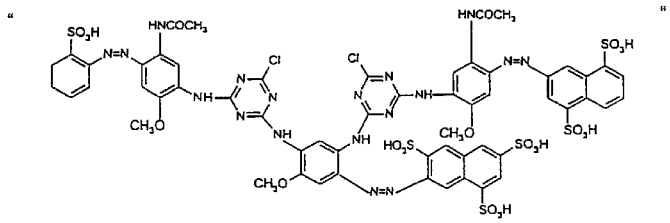

should read

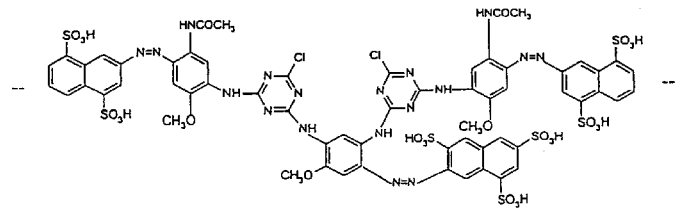

Column 26,
Line 30, "is zero" should read -- p is zero --.

Signed and Sealed this

Twelfth Day of November, 2002

Attest:

JAMES E. ROGAN
Attesting Officer    Director of the United States Patent and Trademark Office